US012568881B2

(12) United States Patent
Keenan et al.

(10) Patent No.: US 12,568,881 B2
(45) Date of Patent: Mar. 10, 2026

(54) MEASURING LOSS AND CALIBRATING LOSS SENSORS ON AN AGRICULTURAL HARVESTER

(71) Applicant: Deere & Company, Moline, IL (US)

(72) Inventors: Andrew W. Keenan, Bettendorf, IA (US); Matthew T. Wold, Bettendorf, IA (US); Mario L. Donini, Bettendorf, IA (US)

(73) Assignee: DEERE & COMPANY, Moline, IL (US)

( * ) Notice: Subject to any disclaimer, the term of this patent is extended or adjusted under 35 U.S.C. 154(b) by 377 days.

(21) Appl. No.: 18/179,790

(22) Filed: Mar. 7, 2023

(65) Prior Publication Data

US 2024/0298571 A1 Sep. 12, 2024

(51) Int. Cl.
*A01D 41/127* (2006.01)

(52) U.S. Cl.
CPC .................................. *A01D 41/1273* (2013.01)

(58) Field of Classification Search
CPC .................................................... A01D 41/1273
See application file for complete search history.

(56) References Cited

U.S. PATENT DOCUMENTS

| | | | |
|---|---|---|---|
| 4,527,241 A | 7/1985 | Sheehan et al. | |
| 4,951,031 A | 8/1990 | Strubbe | |
| 6,029,106 A | 2/2000 | Hale et al. | |
| 6,100,526 A | 8/2000 | Mayes | |

| | | | |
|---|---|---|---|
| 6,119,442 A | 9/2000 | Hale | |
| 6,336,051 B1 | 1/2002 | Pangels et al. | |
| 10,028,435 B2 | 7/2018 | Anderson et al. | |
| 10,285,329 B2 | 5/2019 | Baumgarten et al. | |
| 10,408,645 B2 | 9/2019 | Blank et al. | |
| 10,729,065 B2 | 8/2020 | Pfeiffer et al. | |
| 2003/0066277 A1 | 4/2003 | Behnke | |
| 2003/0130766 A1 | 7/2003 | Braunhardt et al. | |
| 2003/0216158 A1 | 11/2003 | Bischoff | |
| 2005/0137003 A1 | 6/2005 | Behnke et al. | |
| 2006/0069485 A1 | 3/2006 | Diekhans | |
| 2007/0209423 A1 | 9/2007 | Missotten et al. | |
| 2008/0034720 A1 | 2/2008 | Helfrich et al. | |
| 2009/0088932 A1 | 4/2009 | Diekhans et al. | |

(Continued)

FOREIGN PATENT DOCUMENTS

| | | |
|---|---|---|
| DE | 102021117470 A1 | 1/2022 |
| EP | 1674324 B1 | 4/2008 |

(Continued)

*Primary Examiner* — Walter L Lindsay, Jr.
*Assistant Examiner* — Andrew V Do
(74) *Attorney, Agent, or Firm* — Christopher J. Volkmann; KELLY, HOLT & CHRISTENSON PLLC

(57) ABSTRACT

A loss sensor calibration system detects a calibration trigger and measures a distance of travel of a harvester. When the harvester is stopped, the loss sensor calibration system generates an output indicative of a location where a manual loss measurement is to be taken for harvested material loss, relative to the harvester. The loss sensor calibration system generates a measured value input actuator that can be actuated by an operator to input the measured loss value. The loss sensor calibration system generates a scale factor based upon the measured value and applies the scale factor to a sensor signal generated by a material loss sensor to obtain a scaled sensor signal. A control system generates control signals based upon the scaled sensor signal.

20 Claims, 11 Drawing Sheets

(56)                References Cited

U.S. PATENT DOCUMENTS

| | | |
|---|---|---|
| 2009/0125197 A1 | 5/2009 | Behnke |
| 2009/0126327 A1 | 5/2009 | Bussmann et al. |
| 2009/0258684 A1 | 10/2009 | Missotten et al. |
| 2010/0071329 A1 | 3/2010 | Hindryckx et al. |
| 2010/0125788 A1 | 5/2010 | Hieronymus et al. |
| 2010/0217474 A1 | 8/2010 | Baumgarten et al. |
| 2010/0217481 A1 | 8/2010 | Baumgarten et al. |
| 2012/0004812 A1 | 1/2012 | Baumgarten et al. |
| 2014/0050364 A1 | 2/2014 | Brueckner et al. |
| 2014/0171161 A1 | 6/2014 | Bischoff |
| 2014/0215984 A1 | 8/2014 | Bischoff |
| 2014/0236381 A1 | 8/2014 | Anderson et al. |
| 2014/0358466 A1 | 12/2014 | Foster et al. |
| 2015/0009328 A1 | 1/2015 | Escher et al. |
| 2015/0080070 A1 | 3/2015 | Johnson et al. |
| 2015/0116330 A1 | 4/2015 | Chiocco et al. |
| 2016/0106038 A1 | 4/2016 | Boyd et al. |
| 2016/0286721 A1 | 10/2016 | Heitmann et al. |
| 2016/0327535 A1 | 11/2016 | Cotton et al. |
| 2016/0345485 A1 | 12/2016 | Acheson et al. |
| 2017/0032473 A1 | 2/2017 | Koch et al. |
| 2017/0049045 A1 | 2/2017 | Wilken et al. |
| 2017/0071125 A1 | 3/2017 | Pfeiffer et al. |
| 2017/0083035 A1 | 3/2017 | French, Jr. |
| 2017/0160916 A1 | 6/2017 | Baumgarten et al. |
| 2017/0251600 A1 | 9/2017 | Anderson et al. |
| 2018/0108123 A1 | 4/2018 | Baurer et al. |
| 2018/0359917 A1 | 12/2018 | Blank et al. |
| 2018/0359919 A1 | 12/2018 | Blank et al. |
| 2019/0059222 A1 | 2/2019 | Kelber |
| 2019/0090423 A1 | 3/2019 | Escher et al. |
| 2019/0166760 A1 | 6/2019 | Palla et al. |
| 2019/0183045 A1 | 6/2019 | Rademacher |
| 2019/0354081 A1 | 11/2019 | Blank et al. |
| 2020/0008351 A1 | 1/2020 | Zielke et al. |
| 2020/0015416 A1 | 1/2020 | Barther et al. |
| 2020/0019777 A1 | 1/2020 | Gurzoni, Jr. et al. |
| 2020/0128734 A1 | 4/2020 | Brammeier et al. |
| 2020/0221635 A1 | 7/2020 | Hendrickson et al. |
| 2020/0245557 A1 | 8/2020 | Reinecke |
| 2020/0296892 A1 | 9/2020 | Donini et al. |
| 2020/0326674 A1 | 10/2020 | Palla et al. |
| 2021/0015039 A1 | 1/2021 | Vandike et al. |
| 2021/0059117 A1 | 3/2021 | Hunt |
| 2021/0088691 A1 | 3/2021 | Ferren et al. |
| 2021/0105941 A1 | 4/2021 | Yu et al. |
| 2021/0127544 A1 | 5/2021 | Ohrstrom et al. |
| 2021/0209490 A1 | 7/2021 | Casas et al. |
| 2021/0337729 A1 | 11/2021 | O'Connor et al. |
| 2021/0378176 A1 | 12/2021 | Leenknegt et al. |
| 2022/0084191 A1 | 3/2022 | Fischer et al. |
| 2022/0110238 A1 | 4/2022 | Vandike et al. |
| 2022/0110246 A1 | 4/2022 | Vandike et al. |
| 2022/0110253 A1 | 4/2022 | Anderson et al. |
| 2022/0110262 A1 | 4/2022 | Vandike et al. |
| 2022/0113727 A1 | 4/2022 | Vandike et al. |
| 2022/0132736 A1 | 5/2022 | Meyers et al. |
| 2022/0132737 A1 | 5/2022 | Anderson et al. |
| 2022/0176818 A1 | 6/2022 | Piscopo et al. |

FOREIGN PATENT DOCUMENTS

| | | |
|---|---|---|
| EP | 3056076 A1 | 8/2016 |
| EP | 3466238 A1 | 4/2019 |
| EP | 3818803 A1 | 5/2021 |
| GB | 1450956 A | 9/1976 |
| GB | 2144861 A | 3/1985 |
| RU | 2644953 C2 | 2/2018 |
| WO | 2015049847 A1 | 4/2015 |
| WO | 2021116802 A1 | 6/2021 |

Figure 3:
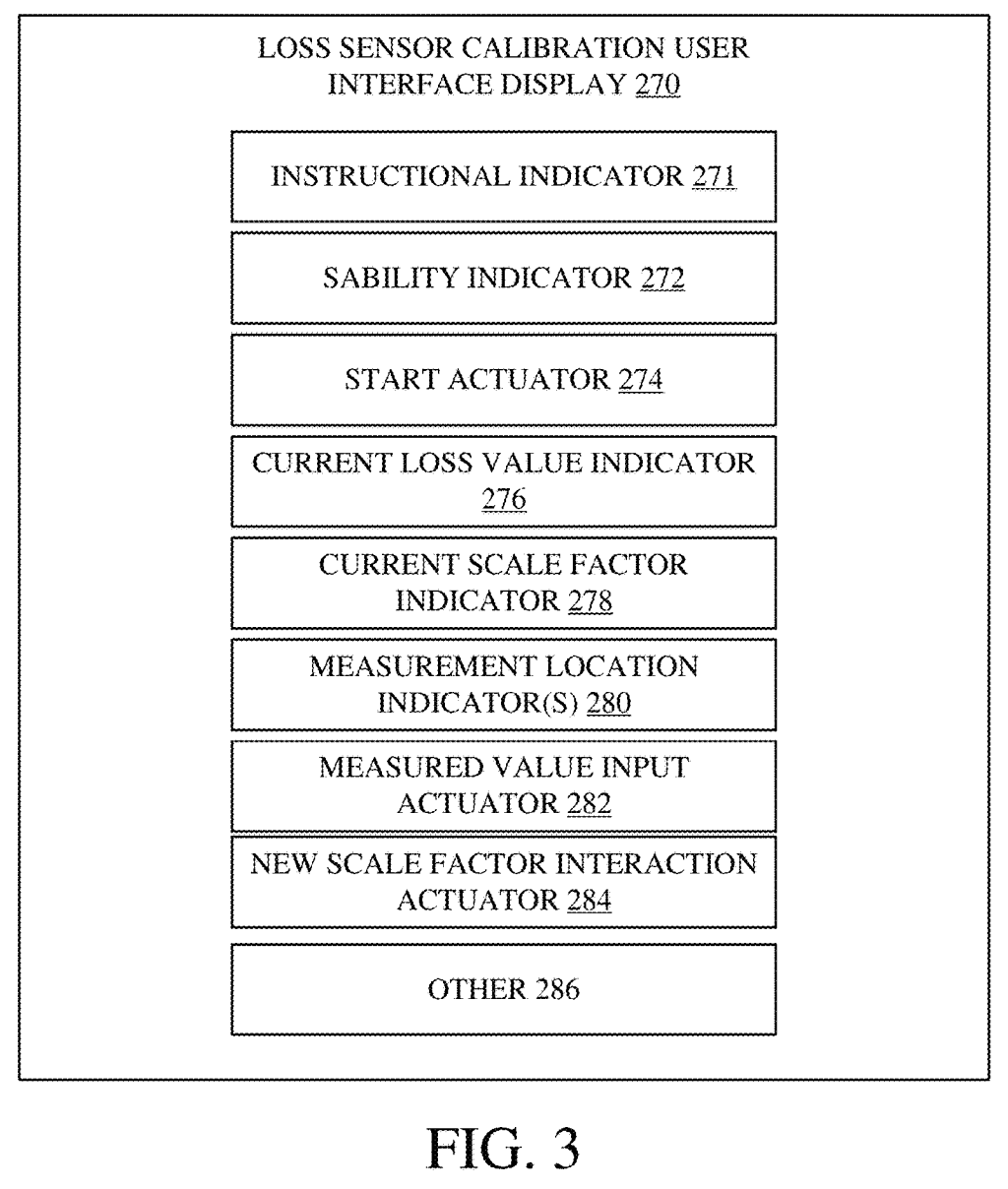

LOSS SENSOR CALIBRATION USER
INTERFACE DISPLAY 270

INSTRUCTIONAL INDICATOR 271

SABILITY INDICATOR 272

START ACTUATOR 274

CURRENT LOSS VALUE INDICATOR 276

CURRENT SCALE FACTOR INDICATOR 278

MEASUREMENT LOCATION INDICATOR(S) 280

MEASURED VALUE INPUT ACTUATOR 282

NEW SCALE FACTOR INTERACTION ACTUATOR 284

OTHER 286

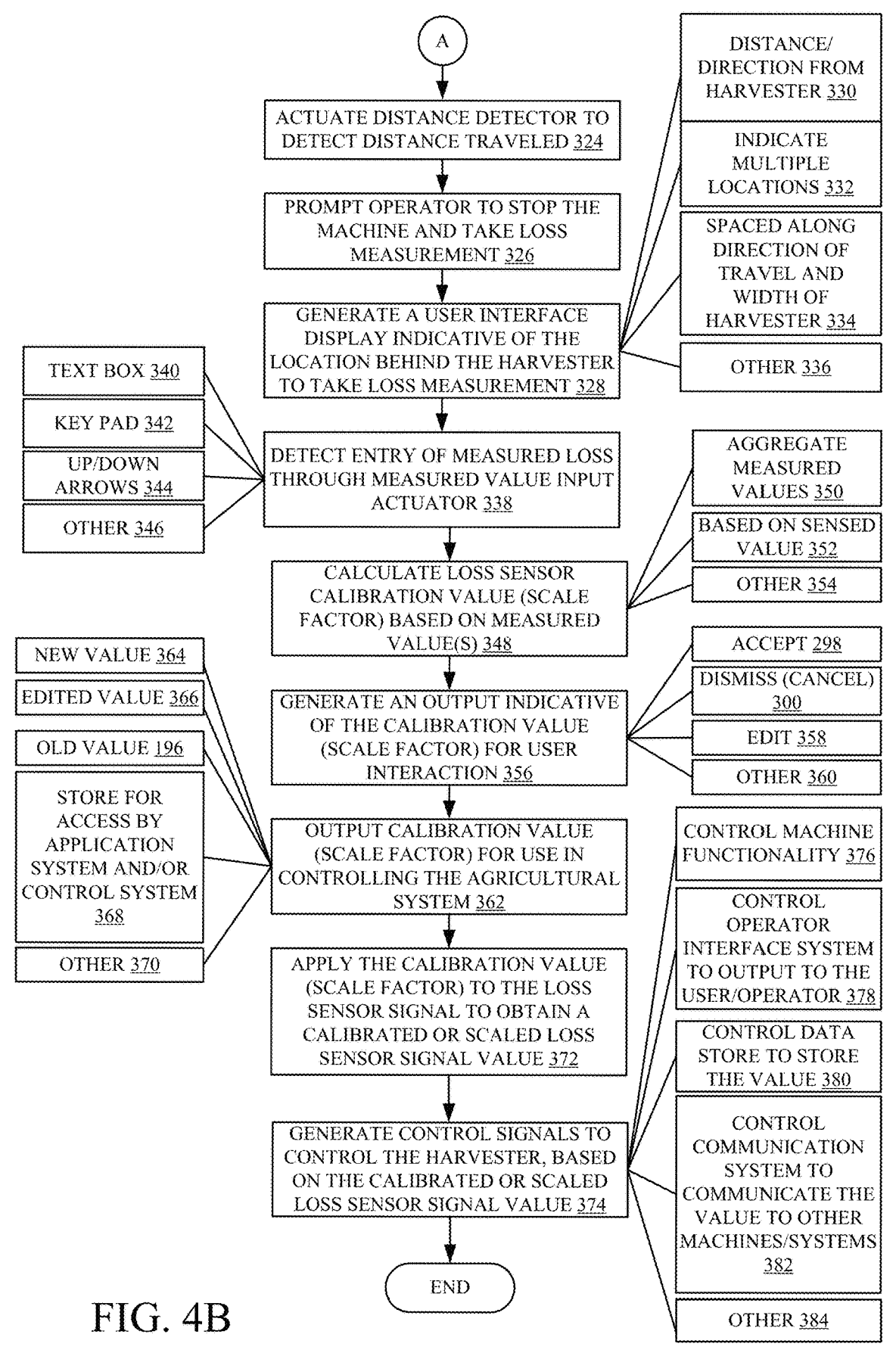

ACTUATE DISTANCE DETECTOR TO DETECT DISTANCE TRAVELED 324

DISTANCE/ DIRECTION FROM HARVESTER 330

PROMPT OPERATOR TO STOP THE MACHINE AND TAKE LOSS MEASUREMENT 326

INDICATE MULTIPLE LOCATIONS 332

GENERATE A USER INTERFACE DISPLAY INDICATIVE OF THE LOCATION BEHIND THE HARVESTER TO TAKE LOSS MEASUREMENT 328

SPACED ALONG DIRECTION OF TRAVEL AND WIDTH OF HARVESTER 334

OTHER 336

TEXT BOX 340

KEY PAD 342

UP/DOWN ARROWS 344

OTHER 346

DETECT ENTRY OF MEASURED LOSS THROUGH MEASURED VALUE INPUT ACTUATOR 338

AGGREGATE MEASURED VALUES 350

BASED ON SENSED VALUE 352

OTHER 354

CALCULATE LOSS SENSOR CALIBRATION VALUE (SCALE FACTOR) BASED ON MEASURED VALUE(S) 348

NEW VALUE 364

EDITED VALUE 366

OLD VALUE 196

STORE FOR ACCESS BY APPLICATION SYSTEM AND/OR CONTROL SYSTEM 368

OTHER 370

ACCEPT 298

DISMISS (CANCEL) 300

EDIT 358

OTHER 360

GENERATE AN OUTPUT INDICATIVE OF THE CALIBRATION VALUE (SCALE FACTOR) FOR USER INTERACTION 356

OUTPUT CALIBRATION VALUE (SCALE FACTOR) FOR USE IN CONTROLLING THE AGRICULTURAL SYSTEM 362

CONTROL MACHINE FUNCTIONALITY 376

APPLY THE CALIBRATION VALUE (SCALE FACTOR) TO THE LOSS SENSOR SIGNAL TO OBTAIN A CALIBRATED OR SCALED LOSS SENSOR SIGNAL VALUE 372

CONTROL OPERATOR INTERFACE SYSTEM TO OUTPUT TO THE USER/OPERATOR 378

CONTROL DATA STORE TO STORE THE VALUE 380

GENERATE CONTROL SIGNALS TO CONTROL THE HARVESTER, BASED ON THE CALIBRATED OR SCALED LOSS SENSOR SIGNAL VALUE 374

CONTROL COMMUNICATION SYSTEM TO COMMUNICATE THE VALUE TO OTHER MACHINES/SYSTEMS 382

END

OTHER 384

FIG. 4B

MEASURING LOSS AND CALIBRATING LOSS SENSORS ON AN AGRICULTURAL HARVESTER

FIELD OF THE DESCRIPTION

The present description relates to agricultural machines. More specifically, the present description relates to calibrating loss sensors on an agricultural harvester.

BACKGROUND

There are a wide variety of different types of agricultural machines. Some agricultural machines include harvesters, such as combine harvester, sugarcane harvester, cotton harvesters, self-propelled forage harvesters, and windrowers. Some harvesters can be fitted with different types of heads to harvest different types of crops.

Many of these types of harvesters include material loss sensors that attempt to sense harvested material that is lost by the harvester during the harvesting operation. By way of example, when the harvester is configured to harvest grain, the harvester can have one or more grain loss sensors that attempt to sense the amount of grain lost during the harvesting operation.

The discussion above is merely provided for general background information and is not intended to be used as an aid in determining the scope of the claimed subject matter.

SUMMARY

A loss sensor calibration system detects a calibration trigger and measures a distance of travel of a harvester. When the harvester is stopped, the loss sensor calibration system generates an output indicative of a location where a manual loss measurement is to be taken for harvested material loss, relative to the harvester. The loss sensor calibration system generates a measured value input actuator that can be actuated by an operator to input the measured loss value. The loss sensor calibration system generates a scale factor based upon the measured value, and applies the scale factor to a sensor signal generated by a material loss sensor, to obtain a scaled sensor signal. A control system generates control signals based upon the scaled sensor signal.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 3 is a block diagram showing one example of a user interface display.

FIGS. 4A and 4B (collectively referred to herein as FIG. 4) show a flow diagram illustrating an example of the operation of an agricultural system.

DETAILED DESCRIPTION

As discussed above, many harvesters have loss sensors that attempt to sense an amount of harvested material that is lost by the harvester during the harvesting operation. Such harvesters often have systems that generate a user interface display or other output indicative of the sensed loss. However, the display or other indication of sensed loss is not in units that can be easily deciphered by the operator. For instance, in one example, one display is simply a numerical output that goes up (as sensed loss goes up) and goes down (as sensed loss goes down). However the numerical output does not represent any units, but instead is simply a number that changes as the sensed loss changes. Other such displays are graphical displays, such as bar graphs, that move up and down as the sensed loss changes. Again, the graphical display does not have units that indicate any type of actual or absolute loss. With such systems, the operator often needs to exit the harvester, and observe the actual loss behind the harvester in order to obtain some understanding of what the numerical or graphical value represents in terms of actual loss or absolute loss. In these types of current systems, the actual or absolute loss values are not displayed because it can be very difficult to generate an accurate actual or absolute loss value.

The present description thus describes a system that, in one example, generates a user interface that indicates, to an operator, a current sensed loss value in absolute or actual terms. The user interface can also indicate where, relative to the harvester, the operator should perform a manual loss measurement to obtain a measured loss value. The present system provides an actuator that can be actuated by the operator to enter the measured loss value. A scale factor is generated so that the current sensed loss value can be scaled to reflect the measured loss value. The scale factor is then applied to generate a more accurate representation of loss.

Figure 1:
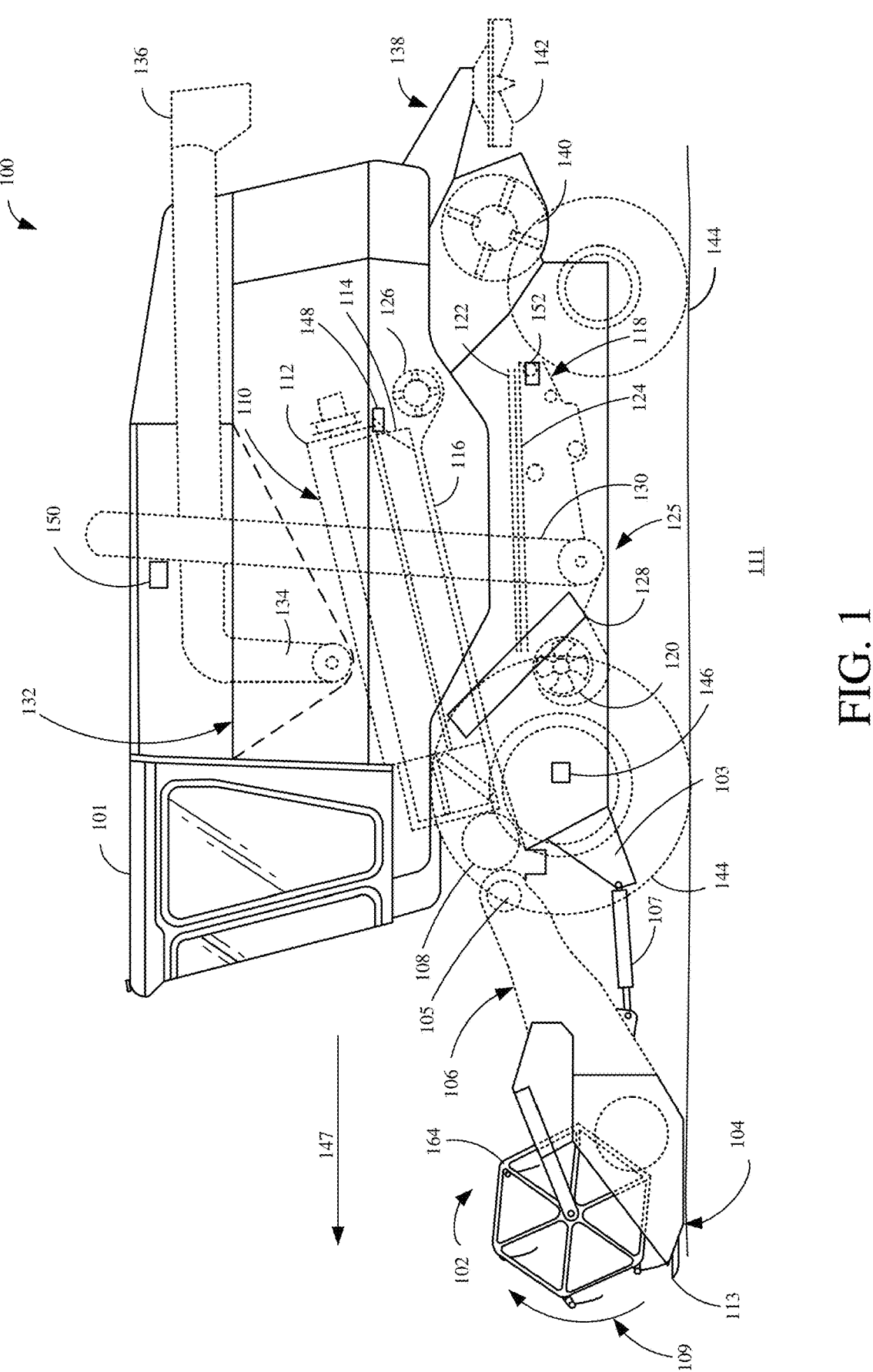
FIG. 1 is a partial pictorial, partial schematic illustration of one example of a combine harvester.

FIG. 1 is a partial pictorial, partial schematic, illustration of a self-propelled agricultural harvester 100. In the illustrated example, agricultural harvester 100 is a combine harvester. Further, although combine harvesters are provided as examples throughout the present description, it will be appreciated that the present description is also applicable to other types of harvesters, such as cotton harvesters, sugarcane harvesters, self-propelled forage harvesters, windrowers, or other agricultural work machines. Consequently, the present disclosure is intended to encompass the various types of harvesters mentioned above and is, thus, not limited to combine harvesters.

As shown in FIG. 1, agricultural harvester 100 illustratively includes an operator compartment 101, which can have a variety of different operator interface mechanisms, for controlling agricultural harvester 100. Agricultural harvester 100 includes front-end equipment, such as a header 102, and a cutter generally indicated at 104. Agricultural harvester 100 also includes a feeder house 106, a feed accelerator 108, and a thresher generally indicated at 110. The feeder house 106 and the feed accelerator 108 form part of a material handling subsystem 125. Header 102 is pivotally coupled to a frame 103 of agricultural harvester 100 along pivot axis 105. One or more actuators 107 drive movement of header 102 about axis 105 in the direction generally indicated by arrow 109. Thus, a vertical position of header 102 (the header height) above ground 111 over which the header 102 travels is controllable by actuating actuator 107. While not shown in FIG. 1, agricultural harvester 100 may also include one or more actuators that operate to apply a tilt angle, a roll angle, or both to the header 102 or portions of header 102. Tilt refers to an angle at which the cutter 104 engages the crop. The tilt angle is increased, for example, by controlling header 102 to point a distal edge 113 of cutter 104 more toward the ground. The tilt angle is decreased by controlling header 102 to point the distal edge 113 of cutter 104 more away from the ground. The roll angle refers to the orientation of header 102 about the front-to-back longitudinal axis of agricultural harvester 100.

Thresher 110 illustratively includes a threshing rotor 112 and a set of concaves 114. Further, agricultural harvester 100 also includes a separator 116. Agricultural harvester 100 also includes a cleaning subsystem or cleaning shoe (collectively referred to as cleaning subsystem 118) that includes a cleaning fan 120, chaffer 122, and sieve 124. The material handling subsystem 125 also includes discharge beater 126, tailings elevator 128, clean grain elevator 130, as well as unloading auger 134 and spout 136. The clean grain elevator moves clean grain into clean grain tank 132. Agricultural harvester 100 also includes a residue subsystem 138 that can include chopper 140 and spreader 142. Agricultural harvester 100 also includes a propulsion subsystem that includes an engine that drives ground engaging components 144, such as wheels or tracks. In some examples, a combine harvester within the scope of the present disclosure may have more than one of any of the subsystems mentioned above. In some examples, agricultural harvester 100 may have left and right cleaning subsystems, separators, etc., which are not shown in FIG. 1.

In operation, and by way of overview, agricultural harvester 100 illustratively moves through a field in the direction indicated by arrow 147. As agricultural harvester 100 moves, header 102 (and the associated reel 164) engages the crop to be harvested and gathers the crop toward cutter 104. An operator of agricultural harvester 100 can be a local human operator, a remote human operator, or an automated system. An operator command is a command by an operator. The operator of agricultural harvester 100 may determine one or more of a height setting, a tilt angle setting, or a roll angle setting for header 102. For example, the operator inputs a setting or settings to a control system, that controls actuator 107. The control system may also receive a setting from the operator for establishing the tilt angle and roll angle of the header 102 and implement the inputted settings by controlling associated actuators, not shown, that operate to change the tilt angle and roll angle of the header 102. The actuator 107 maintains header 102 at a height above ground 111 based on a height setting and, where applicable, at desired tilt and roll angles. Each of the height, roll, and tilt settings may be implemented independently of the others. The control system responds to header error (e.g., the difference between the height setting and measured height of header 104 above ground 111 and, in some examples, tilt angle and roll angle errors) with a responsiveness that is determined based on a selected sensitivity level. If the sensitivity level is set at a greater level of sensitivity, the control system responds to smaller header position errors, and attempts to reduce the detected errors more quickly than when the sensitivity is at a lower level of sensitivity.

Returning to the description of the operation of agricultural harvester 100, after crops are cut by cutter 104, the severed crop material is moved through a conveyor in feeder house 106 toward feed accelerator 108, which accelerates the crop material into thresher 110. The crop material is threshed by rotor 112 rotating the crop against concaves 114. The threshed crop material is moved by a separator rotor in separator 116 where a portion of the residue is moved by discharge beater 126 toward the residue subsystem 138. The portion of residue transferred to the residue subsystem 138 is chopped by residue chopper 140 and spread on the field by spreader 142. In other configurations, the residue is released from the agricultural harvester 100 in a windrow. In other examples, the residue subsystem 138 can include weed seed eliminators (not shown) such as seed baggers or other seed collectors, or seed crushers or other seed destroyers.

Grain falls to cleaning subsystem 118. Chaffer 122 separates some larger pieces of material from the grain, and sieve 124 separates some of finer pieces of material from the clean grain. Clean grain falls to an auger that moves the grain to an inlet end of clean grain elevator 130, and the clean grain elevator 130 moves the clean grain upwards, depositing the clean grain in clean grain tank 132. Residue is removed from the cleaning subsystem 118 by airflow generated by cleaning fan 120. Cleaning fan 120 directs air along an airflow path upwardly through the sieves and chaffers. The airflow carries residue rearwardly in agricultural harvester 100 toward the residue handling subsystem 138.

Tailings elevator 128 returns tailings to thresher 110 where the tailings are re-threshed. Alternatively, the tailings also may be passed to a separate re-threshing mechanism by a tailings elevator or another transport device where the tailings are re-threshed as well.

FIG. 1 also shows that, in one example, agricultural harvester 100 includes ground speed sensor 146, one or more separator loss sensors 148, a clean grain camera 150, which May be in the form of a stereo or mono camera, and one or more loss sensors 152 provided in the cleaning subsystem 118.

Ground speed sensor 146 senses the travel speed of agricultural harvester 100 over the ground. Ground speed sensor 146 may sense the travel speed of the agricultural harvester 100 by sensing the speed of rotation of the ground engaging components (such as wheels or tracks), a drive shaft, an axel, or other components. In some instances, the travel speed may be sensed using a geographic location sensor 147, such as a global positioning system (GPS), another global navigation satellite system (GNSS), a dead reckoning system, a cellular triangulation system, or a wide variety of other systems or sensors that provide an indication of the location of the agricultural harvester 100 in a global or local coordinate system. Travel speed can be sensed or derived from a plurality of outputs from sensor 147.

Loss sensors 152 illustratively provide an output signal indicative of the quantity of grain loss occurring in both the right and left sides of the cleaning subsystem 118. In some examples, sensors 152 are strike sensors which count grain strikes per unit of time or per unit of distance traveled to provide an indication of the grain loss occurring at the cleaning subsystem 118. The strike sensors for the right and left sides of the cleaning subsystem 118 may provide individual signals or a combined or aggregated signal. In some examples, sensors 152 may include a single sensor as opposed to separate sensors provided for each cleaning subsystem 118.

Separator loss sensor 148 provides a signal indicative of grain loss in the left and right separators, not separately shown in FIG. 1. The separator loss sensors 148 may be associated with the left and right separators and may provide separate grain loss signals or a combined or aggregate signal. In some instances, sensing grain loss in the separators may also be performed using a wide variety of different types of sensors as well.

Agricultural harvester 100 may also include other sensors and measurement mechanisms. For instance, agricultural harvester 100 may include one or more of the following sensors: a header height sensor that senses a height of header 102 above ground 111; mechanical stability sensors that sense oscillation or bouncing motion (and amplitude) of agricultural harvester 100; a residue setting sensor that is configured to sense whether agricultural harvester 100 is configured to chop the residue, produce a windrow, etc.; a cleaning shoe fan speed sensor to sense the speed of fan 120; a concave clearance sensor that senses clearance between the rotor 112 and concaves 114; a threshing rotor speed sensor that senses a rotor speed of rotor 112; a chaffer clearance sensor that senses the size of openings in chaffer 122; a sieve clearance sensor that senses the size of openings in sieve 124; a material other than grain (MOG) moisture sensor that senses a moisture level of the MOG passing through agricultural harvester 100; one or more machine setting sensors configured to sense various configurable settings of agricultural harvester 100; a machine orientation sensor that senses the orientation of agricultural harvester 100; and crop property sensors that sense a variety of different types of crop properties, such as crop type, crop moisture, and other crop properties. Crop property sensors may also be configured to sense characteristics of the severed crop material as the crop material is being processed by agricultural harvester 100. For example, in some instances, the crop property sensors may sense grain quality such as broken grain, MOG levels; grain constituents such as starches and protein; and grain feed rate as the grain travels through the feeder house 106, clean grain elevator 130, or elsewhere in the agricultural harvester 100. The crop property sensors may also sense the feed rate of biomass through feeder house 106, through the separator 116 or elsewhere in agricultural harvester 100. The crop property sensors may also sense the feed rate as a mass flow rate of grain through elevator 130 or through other portions of the agricultural harvester 100 or provide other output signals indicative of other sensed variables.

Prior to describing how agricultural harvester 100 generates a loss scale factor and scales a loss sensor signal, an additional description of some of the items on agricultural harvester 100, and their operation, will first be described.

Figure 2:
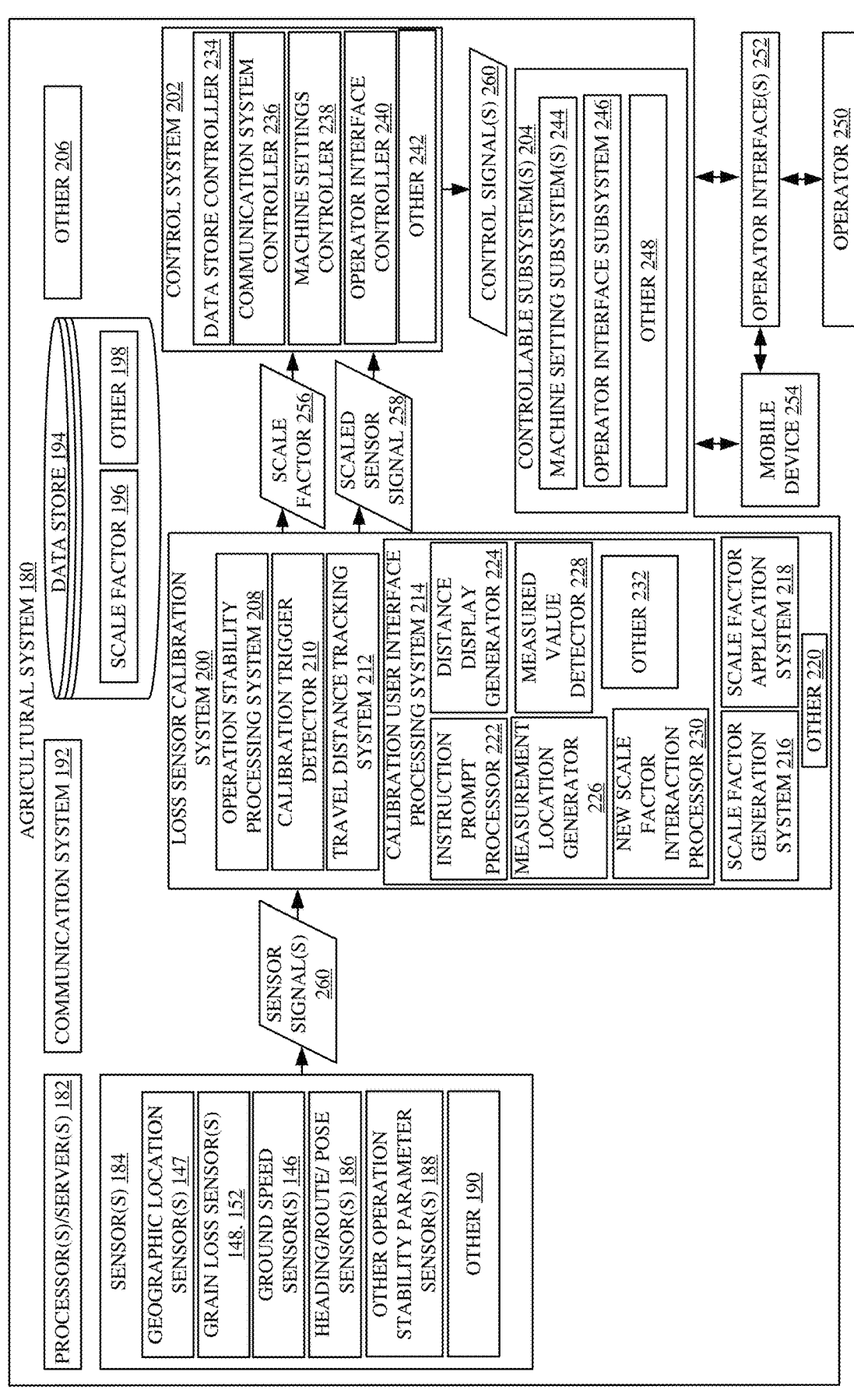
FIG. 2 is a block diagram showing some portions of the agricultural harvester in an agricultural system, according to some examples of the present disclosure.

FIG. 2 is a block diagram showing one example of an agricultural system 180 in which some or all items illustrated in FIG. 1 on harvester 100 may be included. It will be noted that, in one example, agricultural system 180 is entirely disposed on harvester 100. In another example, items in agricultural system 180 may be dispersed among harvester 100 and other machines or other systems. Agricultural system 180 is shown in FIG. 2 as a single system, disposed on harvester 100, for the sake of example only.

In the example shown in FIG. 2, agricultural system 180 includes one or more processors or servers 182, sensors 184 (which can include geographic location sensor 147, grain loss sensors 148, 152, ground speed sensor 146, heading/route/pose sensor 186, other operation stability parameter sensors 188, and other sensors 190). Agricultural system 180 also includes communication system 192, data store 194 (which can include one or more scale factors 196 and other items 198), loss sensor calibration system 200, control system 202, controllable subsystems 204, and other items 206. Loss sensor calibration system 200 can include operation stability processing system 208, calibration trigger detector 210, travel distance tracking system 212, calibration user interface processing system 214, scale factor generation system 216, scale factor application system 218, and other items 220. Calibration user interface processing system 214 can include instruction prompt processor 222, distance display generator 224, measurement location generator 226, measured value detector 228, new scale factor interaction processor 230, and other items 232. Control system 202 can include data store controller 234, communication system controller 236, machine settings controller 238, operator interface controller 240, and other items 242. Controllable subsystems 204 can include machine setting subsystem(s) 244, operator interface subsystem 246, and other items 248.

FIG. 2 also shows that an operator 250 can interact with agricultural system 180 through operator interfaces 252 that can be generated by operator interface subsystem 246 or a mobile device 254, or in other ways. Operator 250 can also interact with agricultural system 180 through other operator interface mechanisms in operator interface subsystem 246. Such mechanisms can include such things as levers, joysticks, a steering wheel, pedals, a display screen, a touch sensitive display screen, actuatable user input mechanisms that can be displayed on a display screen (such as links, button, icons, etc. . . . ) which can be actuated using a point and click device or touch gesture or speech inputs. The operator interface mechanisms can include a wide variety of other audio, visual, or haptic mechanisms that provide outputs to operator 250 and other mechanisms that receive inputs from operator 250.

Heading/route/pose sensors 186 can sense the heading/route/pose of harvester 100 or can generate such information or derive such information from other sensor signals. For instance, sensors 186 can receive multiple successive outputs from geographic location sensors 147 and identify the heading, route, and possible speed, as well as the pose of harvester 100. Sensors 186 can include inertial measurement units, gyroscopic sensors, accelerometers, etc.

Other operation stability parameter sensors 188 sense other parameters (in addition to or instead of those sensed by other sensors) that indicate the operational stability of agricultural harvester 100. For instance, the operational stability is indicative of whether agricultural harvester 100 is operating in conditions under which the signals generated by grain loss sensors 148, 152 are more likely to reflect the grain loss than other conditions. By way of example, when harvester 100 makes a headland turn and is reengaging the crop to be harvested, this is an unstable condition in which harvester 100 may be accelerating, in which only part of the header 102 of harvester 100 may be fully engaged with crop, etc. Under these conditions, the sensor signals generated by grain loss sensors 148 and 152 may be less accurate than under more stable conditions, such as after harvester 100 has fully engaged the crop after a headland turn and is traveling at a near constant speed. Also, other stability parameters may indicate the mass flow rate of harvested material through harvester 100, the ground speed of harvester 100, the pose of harvester 100 (such as whether harvester 100 is on a side hill, an incline or decline, or in a different pose that may affect the accuracy of the grain loss sensor signals generated by grain loss sensors 148, 152), whether the header 102 of harvester 160 is bouncing (e.g., having just gone over a rut), or any of a wide variety of other parameters that may reflect on the operational stability of harvester 100. Sensors 184 generate sensor signals 260 which may be provided to loss sensor calibration system 200 and/or other items in agricultural system 180.

Communication system 192 can facilitate communication of the items in agricultural system 180 with one another, and with external systems, other machines, etc. Therefore, communication system 192 can include a controller area network (CAN) bus and bus controller, and other network communication functionality that may vary, based upon the type of network communication that system 192 communicates over. For instance, communication system 192 can include a wide area network communication system, a local area network communication system, a Bluetooth communication system, a Wi-Fi communication system, a near field communication system, a cellular communication system, or any other of a wide variety of different communication systems or combinations of communication systems.

Operation stability processing system 208 receives sensor signals 260 from sensors 184 and determines whether the agricultural harvester 100 is operating with sufficient stability that a sensor calibration operation can be performed. By way of example, sensor signals 260 that represent operational stability can be compared to threshold values, aggregated, applied to a classifier, or otherwise processed to define whether agricultural harvester 100 is operating with sufficient stability so that a loss sensor calibration operation can be performed. If so, a stability indicator is output on an operator interface 252 for operator 250.

The operator 250 can then manually actuate an input mechanism that is detected by calibration trigger detector 210, indicating that a loss sensor calibration operation should be performed. Travel distance tracking system 212 receives the sensor signals 260 indicative of the geographic position of agricultural harvester 100 to track the distance that agricultural harvester 100 travels before it is stopped. This distance will be used to prompt the operator 250 where to take the manual loss measurement.

Calibration user interface processing system 214 generates an output indicative of a user interface that can be displayed as one of operator interfaces 252 to operator 250. Instruction prompt processor 222 provides instructions prompting operator 250 to perform different operations. Distance display generator 224 displays a distance that harvester 100 has traveled and measurement location generator 226 generates an output indicative of a location where operator 250 is to perform one or more manual loss measurements. Measured value detector 228 generates an actuator that can be actuated by operator 250 to enter the measured loss value(s) that were manually measured by operator 250. Scale factor generator system 216 then generates a scale factor based on the manually entered measured loss values and the current sensor signal from the grain loss sensors 148, 152 generated at or near the locations where loss is measured.

The new scale factor can be displayed for operator 250 using new scale factor interaction processor 230. The new scale factor can be accepted, edited, or dismissed by operator 250. The operator interactions are detected by new scale factor interaction processor 230 to 8 generate an output to scale factor application system 218 and control system 202. Scale factor application system 218 can then apply the new scale factor (if it is accepted by operator 250), or the edited scale factor (if it is edited by operator 250), or the previously stored scaled factor 196 (if the new scale factor is dismissed or cancelled by operator 250) to the sensor signal (or values indicated by the sensor signal) provided by grain loss sensors 148, 152. Applying the scale factor 13 to the sensor signal (or values represented by the sensor signal) generates a scaled sensor signal (also referred to as the scaled loss sensor signal value) 258 which can be provided, along with the new scale factor 256, to control system 202.

Control system 202 can generate control signals 260 based upon the scale factor 256 and the scaled sensor signal 258. For instance, data store controller 234 can generate control signals 260 to control data store 194 to store the new scale factor 256. Communication system controller 236 can generate control signals 260 to control communication system 192 to communicate the new scale factor 256 (and possibly scaled sensor signals 258) to mobile device 254, to other systems, to other machines, etc. Machine settings controller 238 can generate control signals 260 to control machine setting subsystems 244 to modify or control machine settings based on the scale factor 256 and/or the scaled sensor signals 258. Operator interface controller 240 can generate control signals 260 to control operator interface subsystem 246 to generate operator interfaces 252 based on the new scale factor 256, the scaled sensor signals 258, etc.

FIG. 3 is a block diagram showing one example of a loss sensor calibration user interface display 270, which may be one of operator interfaces 252 or another display. In the example shown in FIG. 3, instructional indicator 271 can provide operator 250 with instructions on how to perform the loss sensor calibration operation. Display 270 includes a stability indicator 272 which can indicate whether agricultural harvester 100 is operating in a sufficiently stable manner such that the loss sensor calibration operation can be performed. Indicator 270 may be an alpha-numeric indicator, a colored indicator that changes color depending upon whether agricultural harvester 100 is operating in stable or unstable conditions, a light that lights up, blinks, or otherwise changes based upon whether agricultural harvester 100 is operating in a stable manner, or any of a wide variety of other audio, visual, or haptic indicia indicating the operational stability of agricultural harvester 100.

Start actuator 274 may be an icon or link that can be actuated by operator 250 using a touch gesture, or a point and click device, etc. By way of example, once operator 250 sees that stability indicator 272 indicates that agricultural harvester 100 is operating in a stable way, then operator 250 can touch start actuator 274 to initiate a loss sensor calibration operation.

Current loss value indicator 276 can display a value indicative of an absolute loss value (such as bushels per acre), a percentage loss value (such as X % of harvested material being lost), or another indicator. Current scale factor indicator 278 can be indicative of a current scale factor (such as a numeric scale factor or another scale factor), and measurement location indicators 280 can indicate where the actual loss measurements are to be taken by operator 250, relative to agricultural harvester 100, during the loss sensor calibration operation. It may be, for instance, that in order to provide a more accurate scale factor, a plurality of different manual loss measurements should be taken at different distances behind harvester 100 and different locations across the width of the pass that harvester is taking. These locations can all be indicated by measurement location indicators 280.

Measured value input actuator 282 may be an actuator, such as a text box, or another actuator that can be used by operator 250 in order to enter the measured values after operator 250 performs the manual loss measurement. New scale factor interaction actuator 284 can display the new scale factor (after it is calculated by scale factor generation system 216), along with actuators that allow operator 250 to accept the new scale factor, to edit it, or to dismiss or discard it. Display 270 can include any of a wide variety of other items 286 as well.

Figure 4A:
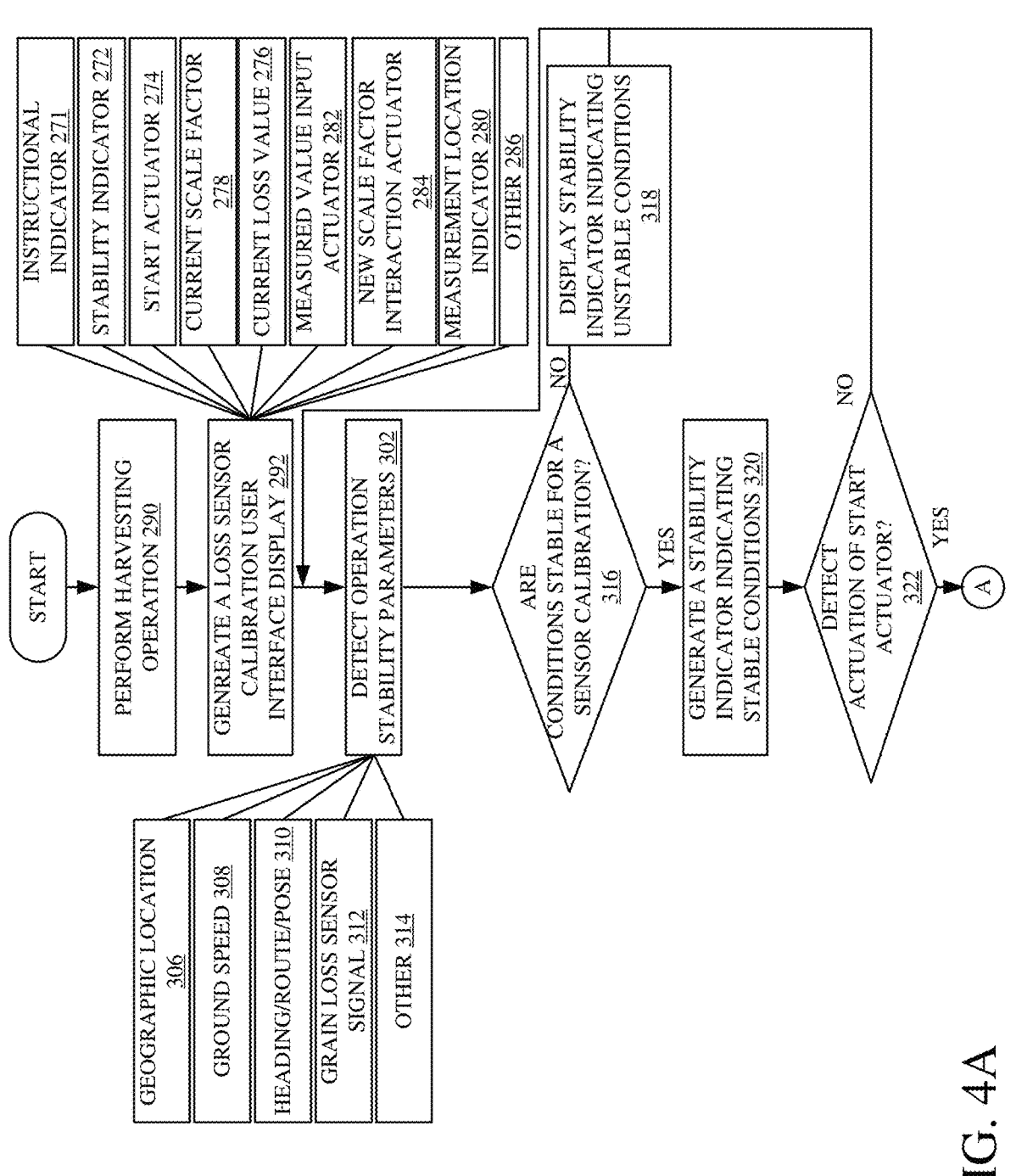

FIGS. 4A and 4B (collectively referred to herein as FIG. 4) show a flow diagram illustrating one example of the operation of agricultural system 180 in performing a loss sensor calibration operation and in using a calibrated or scaled loss sensor signal value to control agricultural system 180. It is first assumed that agricultural harvester 100 is performing a harvesting operation, as indicated by block 290 in the flow diagram of FIG. 4. During that operation, sensors 184 are generating sensor signals 260 indicative of the sensed values. Calibration user interface processing system 214 generates a loss sensor calibration user interface display, as indicated by block 292 in the flow diagram of FIG. 4. The user interface display can be similar to loss sensor calibration user interface display 270 shown in FIG. 3.

Figure 5:
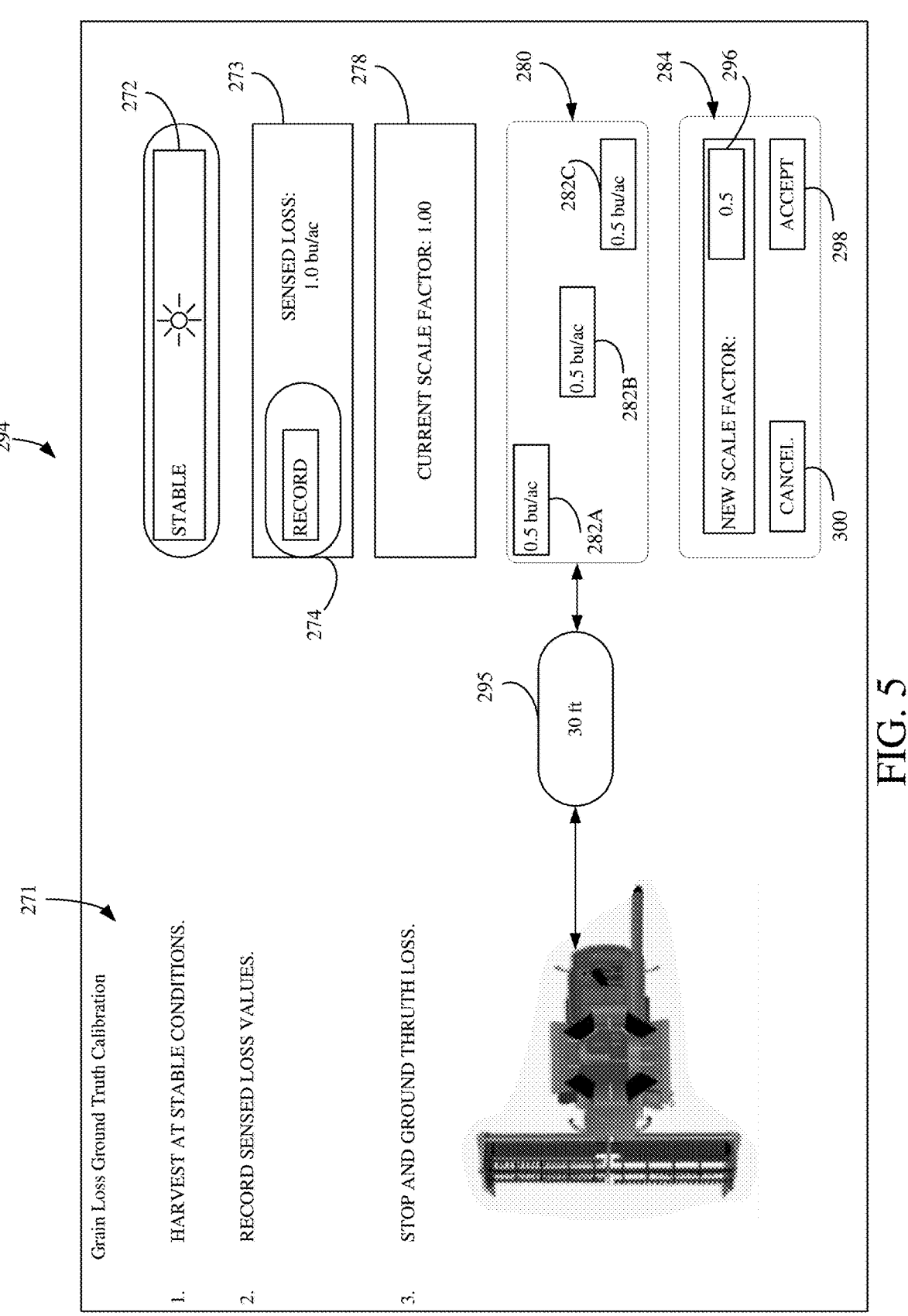
FIG. 5 is an example of a user interface display.

FIG. 5 shows a more detailed example of a loss sensor calibration user interface display 294. Some of the items on display 294 are similar to those described above with respect to FIG. 3, and they are similarly numbered.

The example shown in FIG. 5, shows that instructional indicator 271 includes instructions such as "Harvest at stable conditions.", "Record sensed loss values.", "Stop and ground truth loss.". Stability indicator 272 in the example shown in FIG. 5, includes an indicator light that turns green when conditions are stable for performing the loss sensor calibration operation. Start actuator 274 is shown as a "record" button which becomes active or available for actuation when stability indicator 272 indicates that agricultural harvester 100 is operating in stable conditions. The current loss value 276 shows sensed loss in units of bushels per acre. It will be noted that the current loss value 276 could be another absolute or percentage indicator as well (such as "X % Loss" meaning that for every 100 bushels harvested, X bushels are being lost) or value 276 can have other absolute or percentage units. Current scale factor 278 is simply a numeric value, as shown in FIG. 5, that is used to scale the loss sensor signal value.

The measurement location indicator 280, in the example shown in FIG. 5, includes a distance indictor 294 showing the distance behind agricultural harvester 100 that the manual measurements should be performed. The measured value input actuator 282 includes a plurality of measured value input actuators 282A, 282B, and 282C, in the example shown in FIG. 5. The measured value input actuators 282A-282C are shown as being spread in a transverse direction (e.g., along the width of header 102) across the path that agricultural harvester 100 has taken. Therefore, measured value input actuator 282A indicates that a manual measurement should be performed at a location that is thirty feet behind agricultural harvester 100 and closely proximate one outer edge of the header 102 of agricultural harvester 100 while measured value input actuator 282C shows that a manual measurement should be made at least thirty or more feet behind agricultural harvester 100 and at a location closely proximate the other edge of the header 102 of agricultural harvester 100. Measured value input actuator 282B shows that another manual measurement should be taken at a location located transversely between the measurements taken for actuators 282A and 282C and at a distance behind agricultural harvester 100 in the direction of travel that is also between those taken for actuators 282A and 282C.

New scale factor interaction actuator 284 includes a new scale factor display element 296 as well as an accept actuator 298 and a cancel actuator 300. New scale factor display field 296 displays the new scale factor after it has been generated by scale factor generation system 216 based upon the values entered using actuators 282A-282C. Field 296 may be editable by operator 250 so that operator 250 can modify the new scale factor. In another example, actuator 296 may have arrows or a keypad that allow operator 250 to modify the displayed value. These are examples only.

Returning again to the flow diagram of FIG. 4, operation stability processing system 208 detects operation stability parameters based on the sensor signals 260 or in other ways. Detecting the operation stability parameters is indicated by block 302 in the flow diagram of FIG. 4. The operation stability parameters can include the geographic location 306 (to determine whether agricultural harvester 100 is in the middle of a pass, making a headland turn, etc.), ground speed 308 (to indicate whether agricultural harvester 100 is up to speed and has been traveling at a relatively constant ground speed), heading/route/pose 310 (to indicate whether agricultural harvester 100 is on an incline, turning, etc.), the grain loss sensor signal 312 (to determine whether it sensed grain loss is changing quickly or is relatively stable), and/or any of a wide variety of other operation stability parameters 314.

Operation stability processing system 208 processes the operation stability parameters to determine whether the conditions under which agricultural harvester 100 is operating are stable for a sensor calibration, as indicated by block 316. If not, then operation stability processing system 208 continues to generate the stability indicator indicating unstable conditions, as indicated by block 318 and processing reverts to block 302.

However, if, at block 316, operation stability processing system 208 determines that the conditions are stable for performing a sensor calibration operation, then system 208 generates the stability indicator indicating stable conditions, as indicated by block 320. For instance, referring to the pictorial illustration in FIG. 5, system 208 can show the light in indicator as being green instead of red.

Once the conditions are stable, then calibration trigger detector 210 can activate, or make available, the start actuator 272, and detect when operator 250 actuates start actuator 274. Determining whether the start actuator 222 has been actuated is indicated by block 322 in the flow diagram of FIG. 4. If not, processing again reverts to block 302. However, when the calibration trigger detector 210 detects actuation of the start actuator 272, then detector 210 generates an output indicative of the detected actuation to travel distance tracking system 212, which begins tracking the travel distance that agricultural harvester 100 travels, as indicated by block 324 in the flow diagram of FIG. 4. Instruction prompt processor 222 generates an output instructing the operator to stop the harvester 100 and to take a measurement of loss behind the agricultural harvester 100, as indicated by block 326 in the flow diagram of FIG. 4.

Distance display generator 224 and measurement location generator 226 then generate a user interface display indicative of the location behind agricultural harvester 100 that the loss measurement is to be taken, as indicated by block 328 in the flow diagram of FIG. 4. In one example, the display indicative of the location identifies the distance and direction from agricultural harvester 100 that the measurement is to be taken, as indicated by block 330. The display may indicate multiple locations where a measurement is to be taken, as indicated by block 332. The multiple locations may be spaced along the direction of travel of agricultural harvester 100 and the width of the header 102 (or swath) of harvester 100, as indicated by block 334. The user interface display indicating the location where the measurements are to be taken can be generated in a wide variety of other ways, showing a wide variety of other information as well, as indicated by block 336.

The operator 250 then performs the loss measurement. In one example, the operator 250 may clear debris or residue off of an area behind agricultural harvester 100, at the desired location, where the cleared area has known dimensions (such as a one square foot). The operator 250 may then count the grains in that area and calculate the measured loss based upon the number of grains. In another example, the operator 250 may enter the number of grains into a mobile application which automatically calculates the measured loss (such as in bushels per acre). In another example, a loss pan can be used which is dropped beneath agricultural harvester 100 and which catches lost grain kernels as agricultural harvester 100 harvests. Those grain kernels can then be counted by operator 250 and used to generate the measured loss value. These are just examples and the measured loss value can be measured in a wide variety of other ways as well.

Operator 250 then enters the measured loss value(s) using measured value input actuator 282, as indicated by block 338 in the flow diagram of FIG. 4. Where multiple measured values are taken, multiple values can be entered. The measured value input actuator 282 can be a text box 340, the values can be entered using a keypad 342, using up and down arrows 344, or any of a wide variety of other actuators 346.

Measured value detector 228 detects that the measured values have been entered, and provides those values to scale factor generation system 216 which calculates the loss sensor calibration value (or scale factor) 256 based upon the one or more measured values, as indicated by block 348 in the flow diagram of FIG. 4. In one example, scale factor generation system 216 aggregates multiple measured values (such as by averaging them or otherwise aggregating them) as indicated by block 350. The scale factor can be based on the one or more measured values and based upon the sensed value, as indicated by block 352. The sensor calibration value or scale factor 256 can be generated in a wide variety of other ways as well, as indicated by block 354.

In one example, the scale factor 256 is generated by dividing the measured value (or aggregated measured value) by the current loss value indicated by indicator 276. For instance, assume that the current loss value is two bushels per acre, and the aggregated measured value is 0.5 bushels per acre. In that case, the scale factor 256 can be generated by scale factor generation system 216 as follows:

$$\text{SCALE FACTOR} = \frac{\text{MEASURED LOSS VALUE (OR AGGREGATED VALUE)}}{\text{CURRENT LOSS VALUE (INDICATED BY LOSS SENSOR SIGNAL)}} = \frac{0.5 \ bu/ac}{2.0 \ bu/ac} = 0.25 \qquad \text{EQ. 1}$$

New scale factor interaction processor 230 then generates the new scale factor interaction actuator showing the new loss sensor calibration value or scale factor 256 along with an actuator for user interaction. Generating the output showing the scale factor 256 for user interaction is indicated by block 356 in the flow diagram of FIG. 4. For instance, new scale factor interaction actuator 284 can display the new scale factor 256 and include an accept actuator 298 that can be actuated to accept the new scale factor 256. The actuator

284 can also include a dismiss or cancel actuator 300 or one or more edit actuators 358 that can be used to modify the scale factor 256. The new scale factor interaction actuator 284 can include a wide variety of other items 360 as well.

Loss sensor calibration system 200 can then output the scale factor 256 to scale factor application system 218 and/or to control system 202 and/or to other items for use in controlling agricultural system 180. Outputting the calibration value or scale factor 256 is indicated by block 362 in the flow diagram of FIG. 4. Outputting the scale factor 256 can include the new value 364 where operator 250 accepts the new value, the edited value 366 where operator 250 edited the value, or the old scale factor value 196 where operator 250 canceled or dismissed the new scale factor value. The scale factor 256 can be output for access by the scale factor application system 218 and/or control system 202, as indicated by block 368 in the flow diagram of FIG. 4, or in a wide variety of other ways, as indicated by block 370.

In one example, scale factor application system 218 receives the sensor signals 260 from grain loss sensors 148, 152 and applies the calibration value or scale factor 256 to the loss sensor signal to obtain a calibrated or scaled loss sensor signal value 258. Applying the scale 256 factor to the loss sensor signal to obtain the scaled loss sensor value 258 is indicated by block 372 in the flow diagram of FIG. 4. For instance, where the sensor signal 260 from one of the loss sensors 148, 152 shows a loss of four bushels per acre, and the scale factor is 0.25, then scale factor application system 218 multiples the value indicated by the loss sensor signal by the scale factor to obtain the scaled sensor signal value 258. In this case, the scaled sensor signal 258 would be:

$$4 \ bu/ac * 0.25 = 1 \ bu/ac$$

Control system 202 or other items in agricultural system 180 can then generate control signals to control the agricultural harvester 100 or other items in agricultural system 180 based upon the calibrated or scaled loss sensor signal value 258, as indicated by block 374 in the flow diagram of FIG. 4. For instance, machine settings controller 238 can generate control signals to control settings or other machine functionality, as indicated by block 376. Operator interface controller 240 can generate control signals to control the operator interface subsystem 246 to output the scale factor 256 and/or scaled sensor signal value 258 to the user or operator 250, as indicated by block 378. Data store controller 234 can generate control signals to control data store 194 to store the scale factor 256 and/or the scaled sensor signal value 258, as indicated by block 380 in the flow diagram of FIG. 4. Communication system controller 236 can generate control signals to control communication system 192 to communicate the value(s) to other machines or systems, as indicated by block 382 in the flow diagram of FIG. 4. The other machines can include a second agricultural harvester operating in the same field. The scale factor 256 can be displayed on the second agricultural harvester or otherwise communicated to the operator of the second agricultural harvester so the operator of the second agricultural harvester can enter the scale factor 256, so the scale factor 256 can be used to calibrate or scale sensed loss values on the second agricultural harvester without performing the calibration operation on the second agricultural harvester. Control system 202 can generate any of a wide variety of other control signals 260 to control other portions of agricultural system 180, as indicated by block 384.

It can thus be seen that the present description describes a system in which an operator interface is generated instructing an operator when and where to perform loss measurements. The present system can monitor stability parameters to ensure that a calibration 6 operation is performed, when the agricultural harvester 100 is operating in a stable manner. The operator interface can direct the operator where to take the measurements relative to the agricultural harvester, and provide actuators to enter the measured values for generation of a scale factor. The scale factor can then be output on the interface so the operator can accept the scale factor, reject it, modify it, etc. The scale factor can then be used to scale or calibrate the loss sensor signal values so that the system can be controlled using the calibrated or scaled loss sensor signal values.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface (UI) displays have been discussed. The UI displays can take a wide variety of different forms and can have a wide variety of different user actuatable input mechanisms disposed thereon. For instance, the user actuatable input mechanisms can be text boxes, check boxes, icons, links, drop-down menus, search boxes, etc. The mechanisms can also be actuated in a wide variety of different ways. For instance, the mechanisms can be actuated using a point and click device (such as a track ball or mouse). The mechanisms can be actuated using hardware buttons, switches, a joystick or keyboard, thumb switches or thumb pads, etc. The mechanisms can also be actuated using a virtual keyboard or other virtual actuators. In addition, where the screen on which the mechanisms are displayed is a touch sensitive screen, the mechanisms can be actuated using touch gestures. Also, where the device that displays them has speech recognition components, the mechanisms can be actuated using speech commands.

A number of data stores have also been discussed. It will be noted the data stores can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will be noted that the above discussion has described a variety of different systems, components, generators, detectors, and/or logic. It will be appreciated that such systems, components, generators, detectors, and/or logic can be comprised of hardware items (such as processors and associated memory, or other processing components, some of which are described below) that perform the functions associated with those systems, components, generators, detectors, and/or logic. In addition, the systems, components, generators, detectors, and/or logic can be comprised of software that is loaded into a memory and is subsequently executed by a processor or server, or other computing component, as described below. The systems, components, generators, detectors, and/or logic can also be comprised of different combinations of hardware, software, firmware, etc., some examples of which are described below. These are only some examples of different structures that can be used to form the systems, components, generators, detectors, and/or logic described above. Other structures can be used as well.

Figure 6:
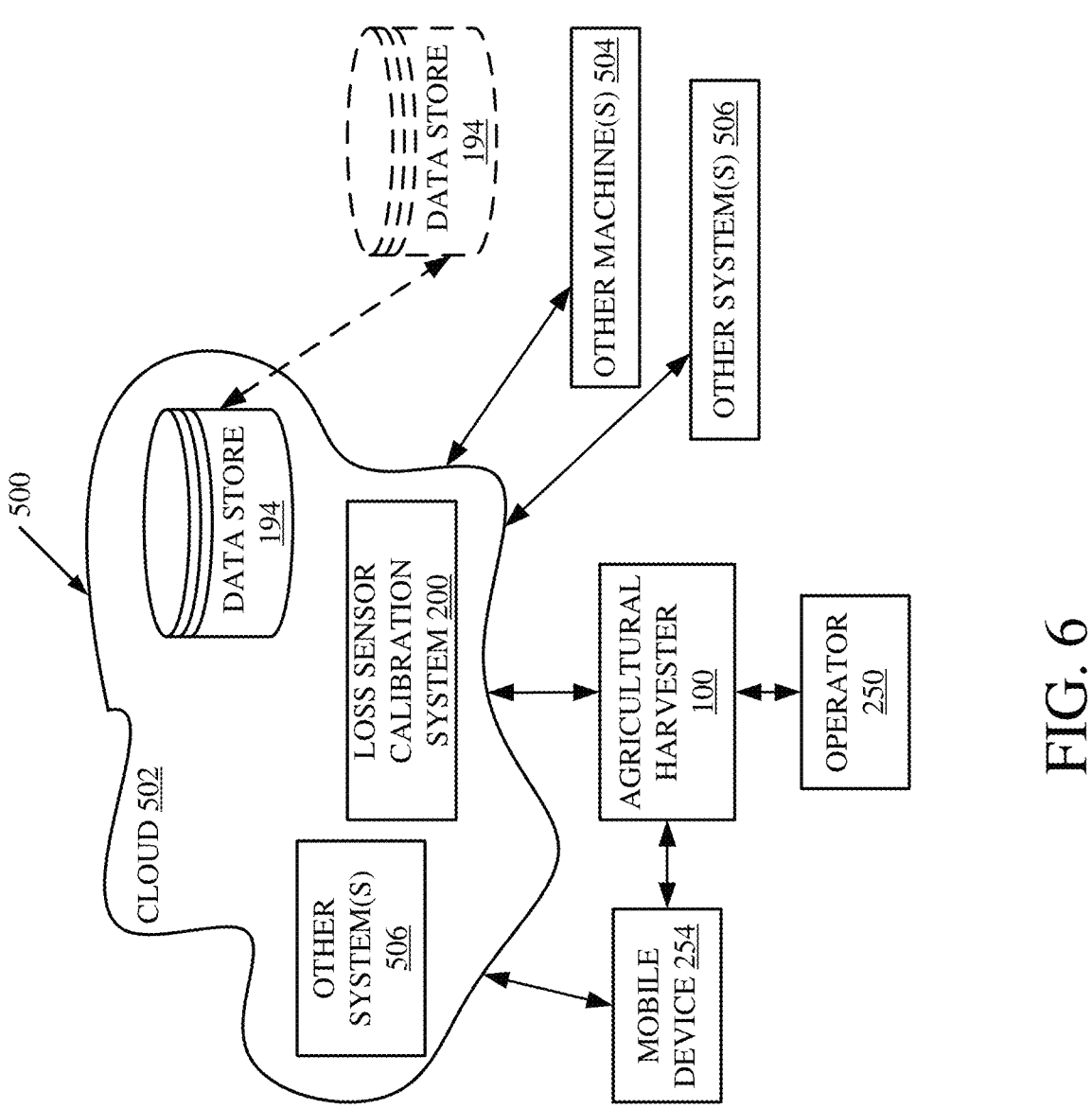
FIG. 6 shows one example of the agricultural system deployed in a remote server architecture.

FIG. 6 is a block diagram of harvester 100, shown in FIG. 1, and agricultural system shown in FIG. 2, except that communicate with elements in a remote server architecture 500. In an example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in previous FIGS. as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, the components and functions can be provided from a conventional server, or they can be installed on client devices directly, or in other ways.

In the example shown in FIG. 6, some items are similar to those shown in previous FIGS. and they are similarly numbered. FIG. 6 specifically shows that loss sensor calibration system 200 and data store 194 can be located at a remote server location 502 along with other systems 506. The other systems 506 can be farm manager systems, vendor, manufacturer, or service systems, or other systems. Therefore, harvester 100 accesses those systems through remote server location 502.

FIG. 6 also depicts another example of a remote server architecture. FIG. 6 shows that it is also contemplated that some elements of previous FIGS. are disposed at remote server location 502 while others are not. By way of example, data store 194 and other systems 506 can be disposed at a location separate from location 502, and items accessed through the remote server at location 502. Also, other machines 504 can be operating in the same field as harvester 100, performing the same operations, in different fields, or performing subsequent operations. Regardless of where the items are located, the items can be accessed directly by harvester 100, through a network (either a wide area network or a local area network), the items can be hosted at a remote site by a service, or the items can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the harvester comes close to the fuel truck for fueling, the system automatically collects the information from the harvester using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein.

Further, the information can be stored on the harvester until the harvester enters a covered location. The harvester, itself, can then send the information to the main network.

It will also be noted that the elements of previous FIGS., or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 7:
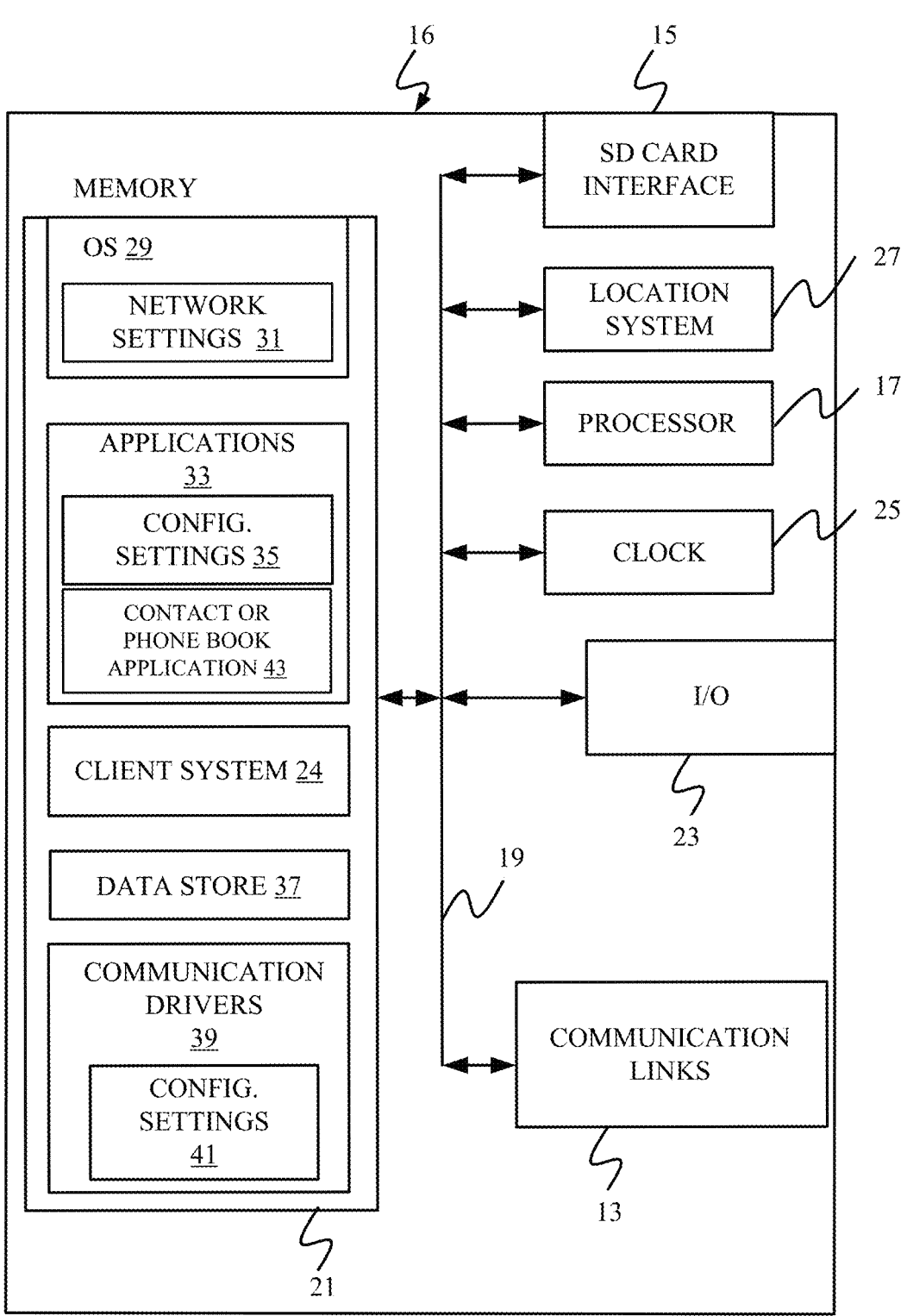
FIGS. 7, 8, and 9 show examples of mobile devices that can be used in systems or architectures described herein.
Figure 8:
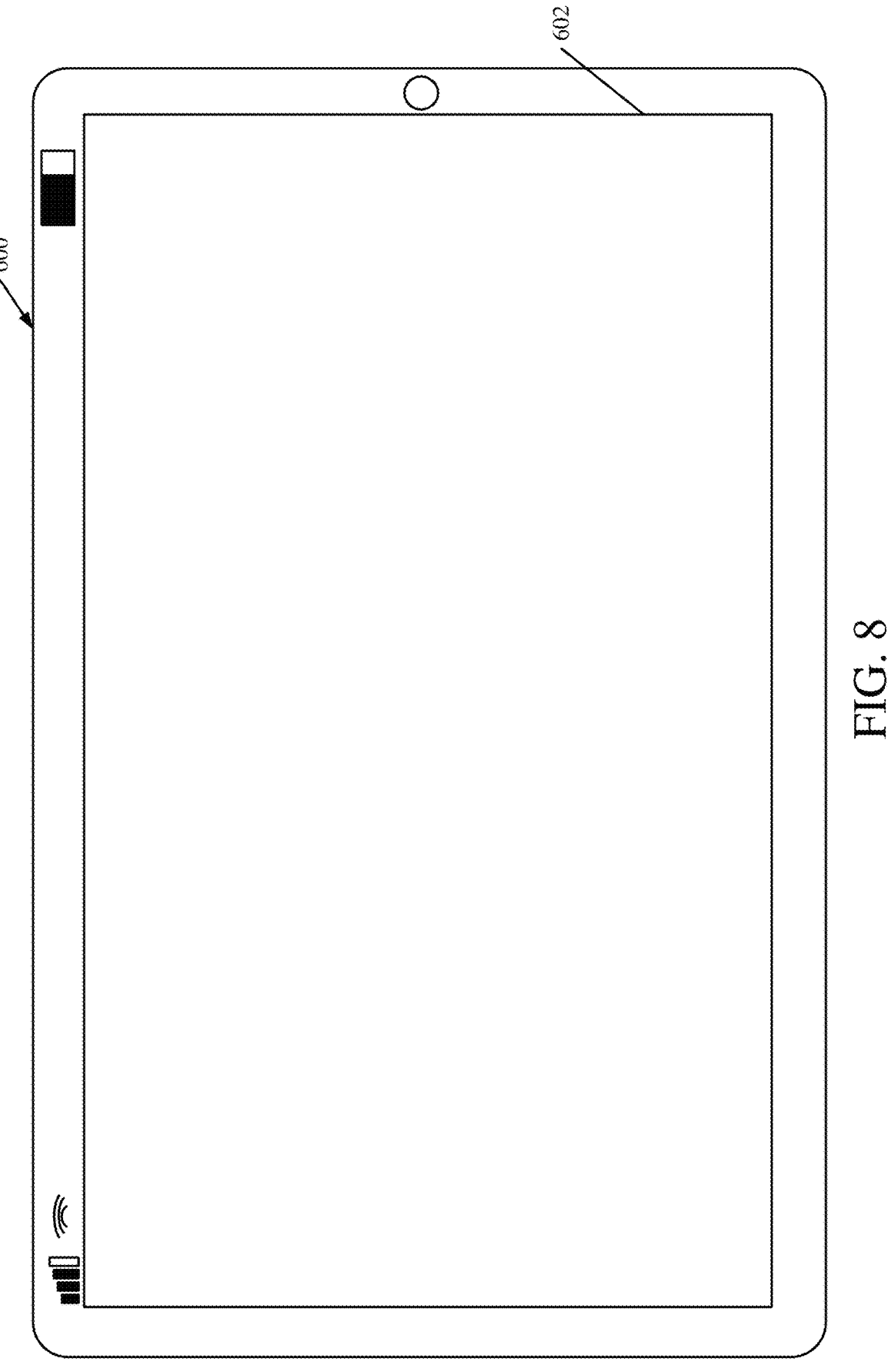
Figure 9:
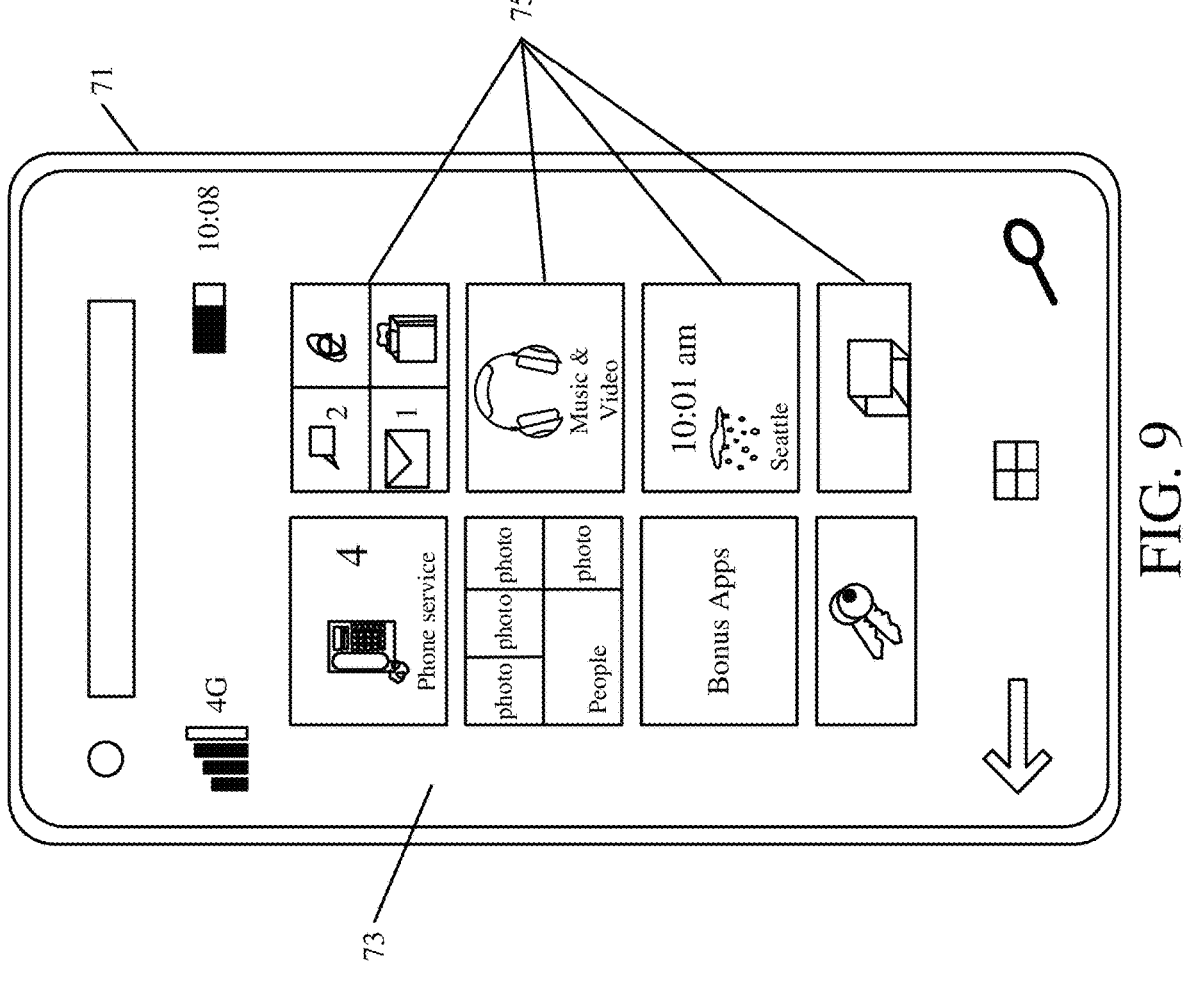

FIG. 7 is a simplified block diagram of one illustrative example of a handheld or mobile computing device that can be used as a user's or client's hand held device 16, in which the present system (or parts of it) can be deployed. For instance, a mobile device can be mobile device 254 carried by operator 250 or deployed in the operator compartment of harvester 100 for use in generating, processing, or displaying the stool width and position data. FIGS. 8-9 are also examples of handheld or mobile devices.

FIG. 7 provides a general block diagram of the components of a client device 16 that can run some components shown in previous FIGS., that interacts with them, or both. In the device 16, a communications link 13 is provided that allows the handheld device to communicate with other computing devices and in some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from previous FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 8 shows one example in which device 16 is a tablet computer 600. In FIG. 8, computer 600 is shown with user interface display screen 602. Screen 602 can be a touch screen or a pen-enabled interface that receives inputs from a pen or stylus. Computer 600 can also use an on-screen virtual keyboard. Of course, computer 600 might also be attached to a keyboard or other user input device through a suitable attachment mechanism, such as a wireless link or USB port, for instance. Computer 600 can also illustratively receive voice inputs as well.

FIG. 9 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 10:
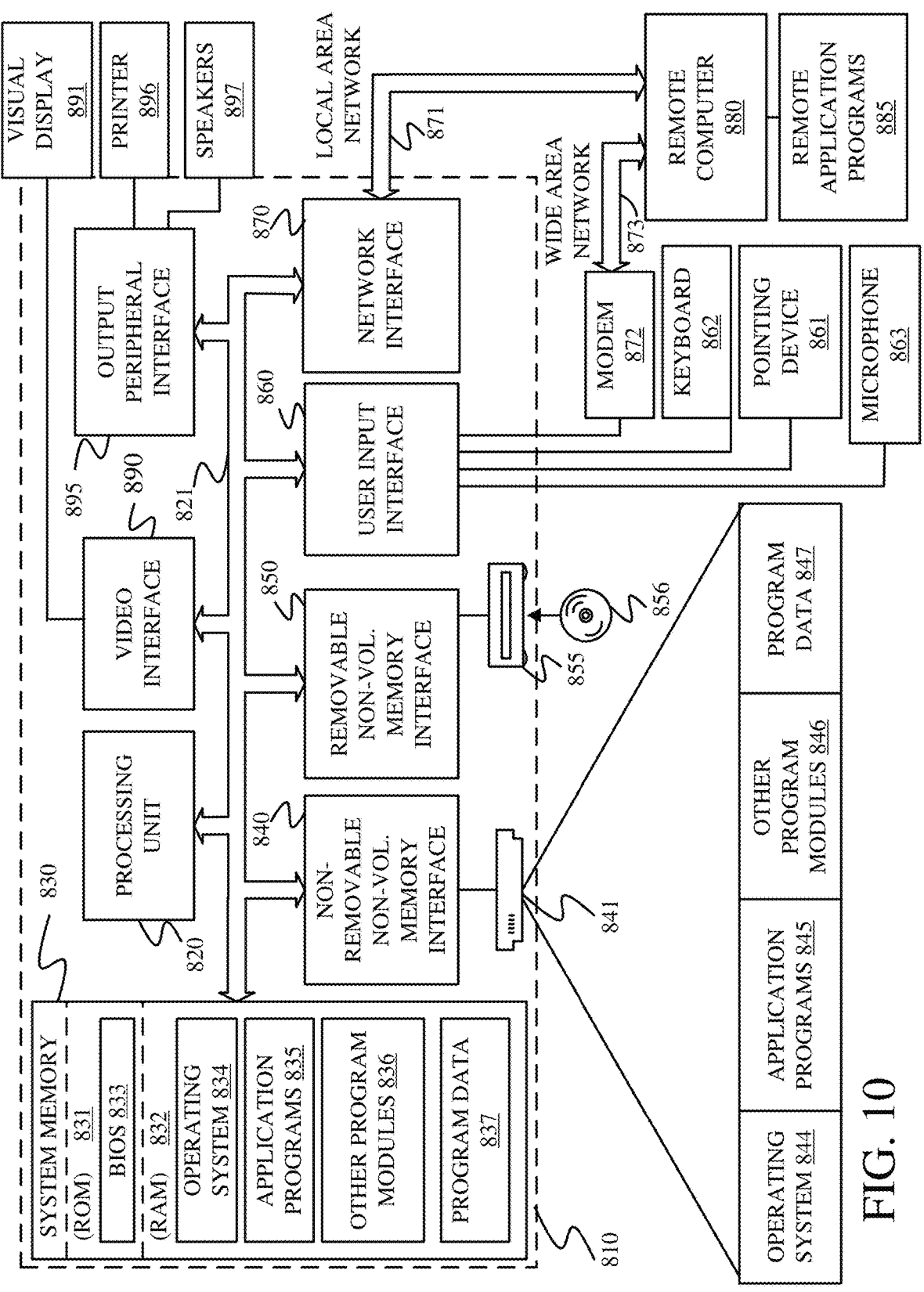
FIG. 10 is a block diagram of one example of a computing environment that can be used in systems or architectures described herein.

FIG. 10 is one example of a computing environment in which elements of previous FIGS., or parts of it, (for example) can be deployed. With reference to FIG. 10, an example system for implementing some embodiments includes a computing device in the form of a computer 810 programmed to operate as described above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to previous FIGS. can be deployed in corresponding portions of FIG. 10.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. Computer storage media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 10 illustrates operating system 834, application programs 835, other program modules 836, and program data 837.

The computer 810 may also include other removable/non-removable volatile/nonvolatile computer storage media. By way of example only, FIG. 10 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 10, provide storage of computer readable instructions, data structures, program modules and other data for the computer 810. In FIG. 10, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the 24 monitor, computers may also include other peripheral output devices such as speakers 897 and printer 896, which may be connected through an output peripheral interface 895.

The computer 810 is operated in a networked environment using logical connections (such as a controller area network—CAN, local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 10 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An agricultural system, comprising:
a material loss sensor configured to sensing material loss from an agricultural harvester during a harvesting operation and generating a loss sensor signal based on the sensed material loss;
a calibration user interface processing system configured to:
identify an operational characteristic of the agricultural harvester;
determine, based on the operational characteristic, a location where a loss measurement is to be taken to measure loss of the material during the harvesting operation; and
generate a user interface display with a measurement location indicator indicative of the location;
a measured value detector configured to detect input of a measured loss value;
a scale factor generation system configured to generate a calibration value based on the measured loss value and the sensed material loss; and
a scale factor application system configured to perform calibration of the sensed material loss based on the calibration value to obtain a scaled loss value.

2. The agricultural system of claim 1 and further comprising:
an operation stability parameter sensor configured to sense a stability parameter and generate a stability parameter sensor signal based on the sensed stability parameter; and
an operation stability processing system configured to receive the stability parameter sensor signal and generate an output indicative of a stability of the harvesting operation performed by the agricultural harvester.

3. The agricultural system of claim 1 and further comprising:
a calibration trigger detector configured to activate, on the user interface display, a calibration trigger actuator that is actuatable based on user interaction with the calibration trigger actuator and to detect, as a calibration trigger, user interaction with the calibration trigger actuator.

4. The agricultural system of claim 1 and further comprising:
a travel distance tracking system configured to identify, as the operational characteristic,
a travel distance of the agricultural harvester, wherein the location is determined based on the travel distance.

5. The agricultural system of claim 4 wherein the calibration user interface processing system comprises:

a distance display generator configured to generate the measurement location indicator based on the travel distance.

6. The agricultural system of claim 5 wherein the distance display generator is configured to generate the measurement location indicator indicative of a plurality of different grain loss measurement locations at different distances behind the agricultural harvester in a direction of travel, based on the travel distance.

7. The agricultural system of claim 4, and further comprising:

a calibration trigger detector configured to detect a calibration trigger, wherein the travel distance tracking system is configured to identify the travel distance of the agricultural harvester after detection of the calibration trigger.

8. The agricultural system of claim 1 wherein the calibration user interface processing system is configured to generate the measurement location indicator indicative of a plurality of different grain loss measurement locations at different locations across a width of a harvesting pass performed by the agricultural harvester.

9. The agricultural system of claim 8 wherein the scale factor generation system is configured to aggregate measured values taken at the plurality of different grain loss measurement locations to obtain an aggregated measured value and to generate the scale factor based on the aggregated measured value.

10. The agricultural system of claim 1 wherein the calibration user interface processing system comprises:

a new scale factor interaction processor configured to output the scale factor along with an operator interaction actuator to detect operator interaction with the scale factor.

11. The agricultural system of claim 10 and further comprising:

an operator interface system configured to display the scaled loss value as at least one of an absolute loss value or as a percentage of harvested material loss value.

12. The agricultural system of claim 1 and further comprising:

a controllable subsystem; and a control system configured to generate control signals to control the controllable subsystem based on the scale factor.

13. The agricultural system of claim 1, wherein the operational characteristic comprises at least one of:

a travel speed of the agricultural harvester, or a width of a header of the agricultural harvester.

14. An agricultural system, comprising:

a calibration user interface processing system configured to:

identify an operational characteristic of an agricultural harvester configured to perform a harvesting operation;

determine, based on the operational characteristic, a location where a loss measurement is to be taken to obtain a measured material loss value indicative of a measure of loss of material during the harvesting operation; and generate a user interface display with a measurement location indicator indicative of the location;

a measured value detector configured to detect input of the measured material loss value;

a scale factor generation system configured to receive a sensed material loss value and generate a sensor calibration value based on the measured material loss value and the sensed material loss value; and a scale factor application system configured to perform calibration of the sensed material loss based on the sensor calibration value.

15. The agricultural system of claim 14 and further comprising:

an operator stability parameter sensor configured to detect a set of parameters and generate an output indicative of when the loss measurement is to be taken based on the detected set of parameters.

16. The agricultural system of claim 14 wherein the calibration user interface processing system comprises:

a material loss sensor configured to sense material loss at a material loss sensor location and to generate a material loss value; and a distance display generator configured to generate, as the measurement location indicator, a distance display element indicative of a distance behind an agricultural harvester that the loss measurement is to be taken, based on the material loss sensor location.

17. The agricultural system of claim 14 wherein the calibration user interface processing system comprises:

a measurement location generator configured to generate, as the measurement location indicator, a plurality of location display elements, each indicative of a location relative to a width of a header of an agricultural harvester where a loss measurement is to be taken.

18. The agricultural system of claim 14 wherein the calibration user interface processing system comprises:

an instruction prompt processor configured to generate on the user interface display an instructional indicator instructing an operator of an agricultural harvester performing the harvesting operation when to stop the agricultural harvester to take the loss measurement.

19. The agricultural system of claim 14 and further comprising:

a material loss sensor configured to sense material loss from an agricultural harvester during a harvesting operation and generate a loss sensor signal indicative of the sensed material loss value wherein the scale factor application system is configured to perform calibration of the loss sensor signal based on the sensor calibration value to obtain a scaled material loss value.

20. A method comprising:

receiving a sensor calibration value on a first agricultural harvester from a second agricultural harvester;

generating a user interface display with a calibration value entry element;

detecting a calibration value operator input indicative of the received sensor calibration value through the calibration value entry element;

detecting a sensed material loss value indicative of a sensed material loss on the first agricultural harvester; and performing calibration of the sensed material loss value on the first agricultural harvester using the sensor calibration value.

\* \* \* \* \*